United States Patent [19]

Martin

[11] Patent Number: 5,232,276
[45] Date of Patent: Aug. 3, 1993

[54] ADAPTER FOR RELEASABLY SECURING A COMPUTER AND A PRINTER IN FIXED, SPATIAL RELATION

[76] Inventor: Mitchell L. Martin, P.O. Box 691226, San Antonio, Tex. 78269

[21] Appl. No.: 686,132

[22] Filed: Apr. 16, 1991

[51] Int. Cl.$^5$ ............................................. A47B 21/00
[52] U.S. Cl. .............................. 312/208.4; 312/223.3; 312/208.2; 248/676
[58] Field of Search .................. 312/208, 196, 208.1, 312/208.2, 208.3, 208.4, 223.3; 248/676; 108/56, 27; 361/393, 380

[56] References Cited

U.S. PATENT DOCUMENTS

| | | | |
|---|---|---|---|
| 4,600,249 | 7/1986 | Anderson | 312/208 |
| 4,600,250 | 7/1986 | Windham | 312/208 |
| 4,658,956 | 4/1987 | Takeda et al. | 43/16 |
| 4,790,431 | 12/1988 | Reel et al. | 85/38 |
| 4,896,776 | 1/1990 | Kabanuk et al. | 85/38 |

OTHER PUBLICATIONS

Exhibit D is a two-page flyer from TENBA ® Computer Travelers describing a carrying case for a computer and its accessories.
Exhibit E is a two-page flyer describing a Gamber-Johnson mobile phone mount and mounts for laptop computers.
Exhibit F is four pages from the May 1991 "Laptop" magazine which describes a Targus Universal Notebook Case, a Canon ® Bubble Jet Printer with carrying case and a Computer Coverup, Inc. carrying case for a laptop computer.
Exhibit A is a single sheet flyer describing a "Samsonite" ® Laptop Computer Case.
Exhibit B is a four-page circular describing a P.A.C.E. carrying case designed to to protect a computer.
Exhibit C is a two-page flyer describing a TELCON ® laptop printer with a case.

Primary Examiner—Kenneth J. Dorner
Assistant Examiner—Gerald A. Anderson
Attorney, Agent, or Firm—Gunn Lee & Miller

[57] ABSTRACT

An adapter (10) to releasibly retain a lap top computer and a printer to an enclosed carrying case. The adapter comprises a frame made up of a floor (15), two side walls (12) and (14), and a partially closed top bordered by rails (16) and (18) perpendicular to and integral with the side walls (12) and (14). Both ends (22) and (24) are substantially open. A partition (20) across the side walls (12) and (14) connecting one to the other divides the frame into an electrical compartment (36) and a paper compartment (34). The lap top and the printer rest on the base rails (16) and (18), the printer receiving paper resting in the paper compartment (34) and coming through the open end of the paper compartment (34). The power supplies to the lap top and the printer, respectively, reside in the electrical compartment (36) with cords from an external AC power source having access through the open end of the electrical compartment (36).

14 Claims, 3 Drawing Sheets

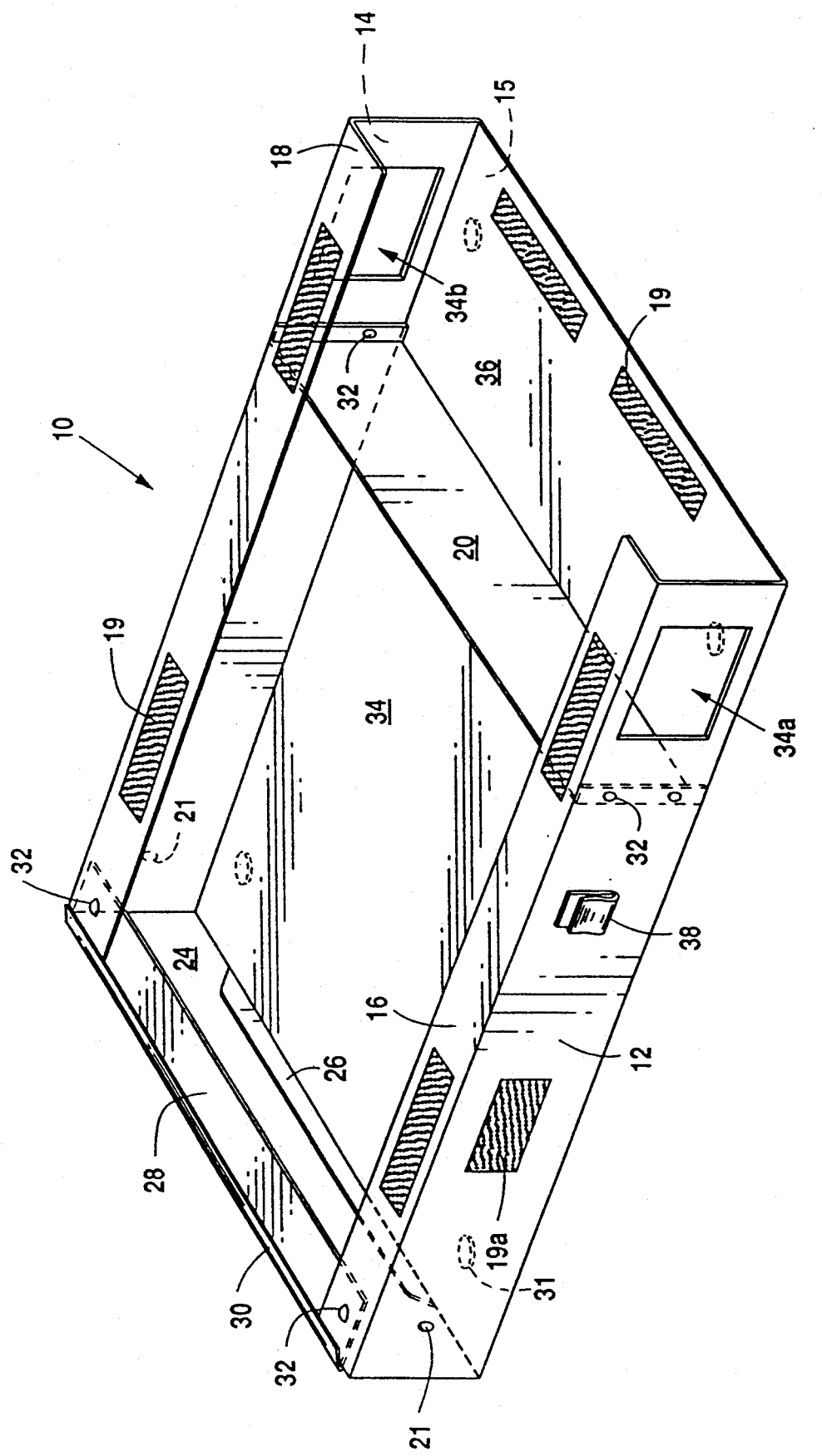

ADAPTER FOR RELEASABLY SECURING A COMPUTER AND A PRINTER IN FIXED, SPATIAL RELATION

FIELD OF THE INVENTION

This invention relates to a portable computer work station having an adapter designed to hold a portable computer in fixed spatial relation with a printer, and to enclose within the adapter the printer paper and the power supplies for the computer and the printer.

BACKGROUND OF THE INVENTION

Recent years have seen a trend to down size computers. Presently there are generally speaking, physical size classifications for computers that are arranged as follows( largest to smallest): main frame, personal, desk top, lap top, note pads (notebook) and hand held. The latter three categories include computers which are easily carried by a person. Printers for computers have kept a pace with the down sizing trends also. They too are easily carried by a person and come in portable sizes.

The consumer often desires portability as a feature of his computer work station, the work station having the computer, the printer, at least one power supply and paper. Thus, the computer, printer, paper and related accessories such as power supplies and electrical cables (collectively the "components") are often packed into a case, bag or the like for ease of transportation.

These components, being fragile, must be packed carefully. Typically, they are packed in hard case or soft cases. The soft case is often a canvas or vinyl bag with a foam lining. Such a bag does not physically hold the components and accessories together as a working unit but does form some limited protection from interference from outside. Typical hard cases comprise a small, hinged suitcase (similar to those used for luggage) containing cut-out foam. Such cases are typical of those for video cameras and for hand held cameras. The cut-out foam generally contains two main pockets, one pocket for the lap top and one pocket for the printer. A number of pockets are also cut out for the accessories (power supplies, cables, paper and the like). The accessories are usually disassembled and need to be placed together before use. These cases have no place for paper or printer stand. The accessories still need to be assembled before use. Moreover, the hard case/foam type generally collect dust or create their own by the dissolution of the foam. The dust gets into the components and creates problems. Additionally, as the foam settles, the fit loosens. The typical hard case/foam when turned upside down will allow the components to fall loosely within, or out of, the case. The components in such cases cannot be removed as a unit assembly, but require assembly. Thus, none of the typical hard or soft cases can be defined as a portable work station. That is, a portable work station requires the two main components of the system, the computer and the printer, to be held rigidly within the case in pre-assembled, ready to use positions. None of the typical hard or soft cases adapt the computer, the printer, the paper (in position for use) and related accessories to the case in a manner which allows ready use of the system upon opening the case, without any pre-assembly.

One such case which does provide such portability is the Gemini I, II and III from Gemini, Inc., Canon Falls, Minn., as more fully described in U.S. Pat. No. 4,896,776 (1990, Kabanok et al). The Gemini is a portable work station enclosed in a hard case which allows the user, upon opening the case, to use the system without further assembly of the components. The Gemini consists of a molded plastic floor with a support pedestal for the lap top and the printer permanently attached to the bottom of the case. The paper feeds the printer through a storage compartment beneath the printer stand. The lid of the hard case is detachable. However, the Gemini is not adapted to store accessory items. Nor is the Gemini adapted to properly guide paper from the paper storage compartment to the printer. The lack of proper paper guides, the lack of proper accessory storage compartment areas, as well as the generally limited ability of the Gemini to portably maintain all the components of the work place in a self-contained system, has presented severe shortcomings to the consumer.

Last, the Gemini unit is integral with the bottom shell of the case and not removable from it. Thus, there is needed a portable work station having a hard case in which is contained an adapter which spatially fixes a lap top computer and a printer over a paper and accessories' compartment, which adapter may be easily removed from the hard case, without the use of tools.

SUMMARY OF THE INVENTION

It is the object of the present invention to provide for an adapter for holding a computer, a printer, paper and related accessories therefore in a protective hard case, spatially arranged to be used as a portable work station without pre-assembly.

It is another object of the present invention to provide for an adapter which organizes a lap top computer, a printer and a stack of paper, along with the necessary power adapters, electrical cords, and signal cables in a ready to go, pre-arranged package which only requires an external voltage source (or internal batteries) in order to compute and print.

It is another object of the present invention to provide for an aluminum frame which may be permanently or removably attached to a shell of a protective hard case, which frame contains rails on top and compartments beneath, the rails for holding a small, portable computer and a printer in the same general plane, the compartments for holding paper and electrical accessories.

It is a further object of the present invention to provide an adapter for a lap top computer which will hold the computer and the printer in a fixed spatial relation, and which will removably attach to the bottom section of a detachable, hinged, protective hard case.

It is a further object of the present invention to provide for an adapter for holding a lap top computer and a printer in fixed, spatial relation, the adapter having a floor, two side walls, two base rails, a means for attaching a lap top printer to the top side of the base rails, and further having a partition within the adapter providing for a paper compartment beneath the printer and an accessory compartment beneath the lap top.

This and other purposes will be obvious from the specifications as set forth more further below.

BRIEF DESCRIPTION OF THE DRAWINGS

FIG. 1 is a perspective view of the adapter.

DETAILED DESCRIPTION OF THE PREFERRED EMBODIMENTS

Figure 2A:
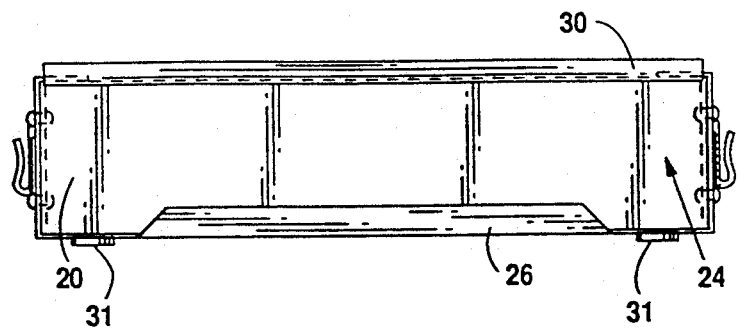
FIG. 2A is a rear end view of the adapter.

FIGS. 1, 2A, 2B and 2C illustrate views of the adapter (10). Thus, it can be seen with reference to FIGS. 1, 2A, 2B and 2C that adapter (10) is made up of a left side wall (12), a right side wall (14), the walls bordering a generally rectangular floor (15). With further reference to the FIGURES, adapter (10) can be seen to have a left base rail (16) and a right base rail (18). The base rails have a top and a bottom surface. On the top surface thereof are attachment means (19). Side walls (12) and (14) contain dimples (21) at one end thereof. Thus, the side rails, the floor and the base rails are configured to generally form a rectangular open topped frame.

A divider partition (20) separates an interior portion of the frame into two compartments. Divider partition (20) can be seen to be generally closer to one end of the frame than the other. The compartments of the frame have an open end (22) and (24) at either end. Open end (24) has a tab (26) and side walls (12) and (14) of cross brace (28) at one end thereof. Tab (26) does not extend all the way across to the side walls. This makes it easy to insert and remove paper from the interior of adapter (10), while generally holding the paper in its compartment.

Along cross brace (28) is lip guide (30). Lip guide (30) assists in alignment of the edge of the printer when placed on base rails (16) and (18), supports side walls (12) and (14), and is curved to assist the paper in making a smooth transition into the printer. The floor contains on an exterior surface thereof four cushions (31) made of rubber or the like, to provide for resting on a surface without scratching or sliding the same. Fasteners (32), such as rivets, welds, or the like are located as indicated in FIG. 1 to provide for sturdy structure. On an interior of floor (15) are located additional attachment means (19).

Thus, it can be seen that the adapter consists of floor, side walls, base rails and a divider partition which creates paper compartment (34) and electrical compartment (36). In addition, clips (38) allow for convenient fastening of electrical cords or other conductors at various locations on adapter (10). As can be further be seen, windows (34a) and (34b) provide access through either or both of the side walls thus, allowing electrical cords and the like to reach electrical accessories located in electrical compartment (36).

Figure 2B:
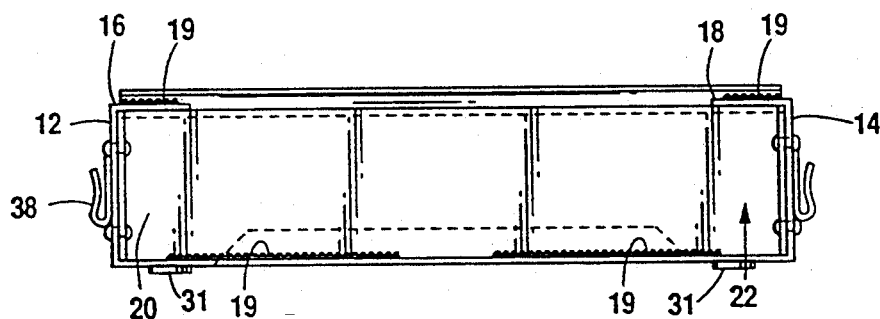
FIG. 2B is a front end view of the adapter.
Figure 2C:
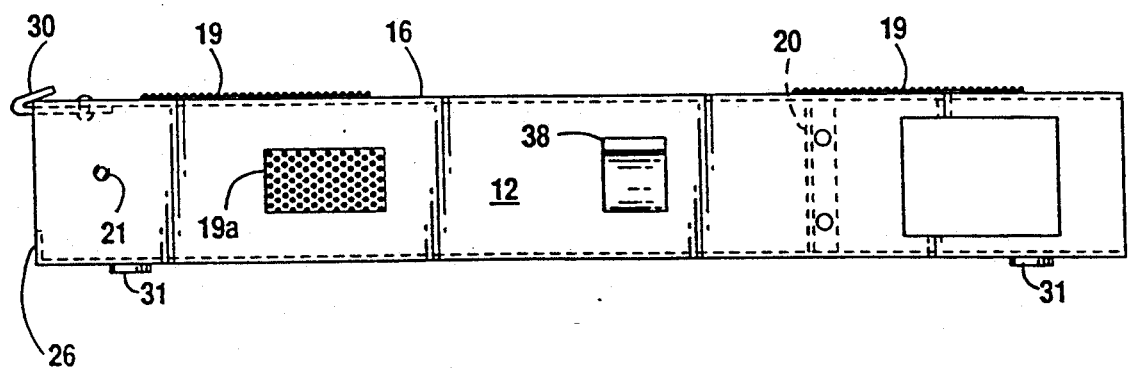
FIG. 2C is a side view of the adapter.

FIGS. 2A-2C provide a greater appreciation for the dimensions of adapter (10). Thus, it can be seen that the length of the floor is about 15 inches, the width about 9.6 inches and the height of side walls about 2.3 inches.

Dimensions are illustrated in FIGS. 2A-2C and include tab (26) being approximately 4 to 7 inches wide and 0.5 to 1 inch high. The exterior dimensions of the adapter are generally 15 to 20 inches × 9 to 10 inches × 1.5 to 3 inches. The paper compartment will hold over one inch of standard tractor feed paper. The adapter, thus dimensioned, will accommodate most note pads, lap tops and printers. These dimensions will allow the adapter to facilitate the new "note pad" sized computer. Printers which the adapter may use include, but are not limited to, the Kodak Diconix 150 Plus and the Canon BJ-10e; the lap tops include, but are not limited to, Toshiba, Compaq, Zenith or Grid. The note pad size is generally 8.5 inches × 11 inches × 2 inches.

The paper compartment is about 11 inches long and 9.6 inches wide. The electrical compartment is approximately 4.3 inches long and 9.6 inches wide.

Figure 3:
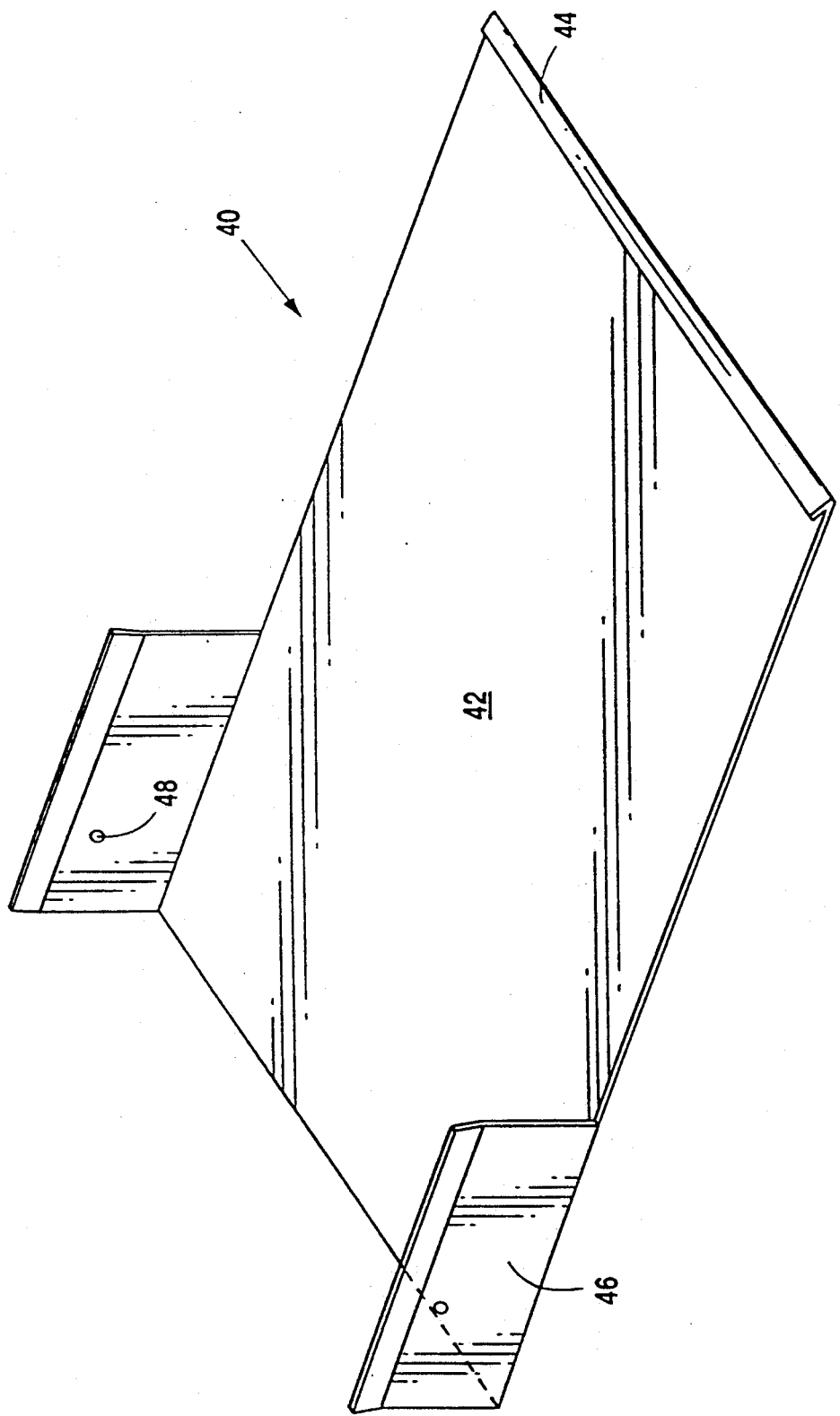
FIG. 3 is a perspective view of the release bracket.

FIG. 3 illustrates a release bracket (40) which is used in conjunction with adapter (10) to releasibly fix the adapter, with the components thereon, to the bottom of a hard case (not shown). Release bracket (40) is made up of a base (42), a catch lip (44) and ears (46) with holes (48) therein. As can be further appreciated from FIG. 3, base (42) is fixedly attached to the bottom of a hard case. Ears (46) are bent slightly inward, making an interior angle of slightly less than 90° with the base of release bracket (40). Thus, adapter (10), on which is placed the lap top computer and the printer, and which further contains a load of paper in paper compartment (34) and sorted electrical components in electrical compartment (36), is placed onto base (42) one end thereof under catch lip (44). Ears (46) spread slightly apart, allowing the side walls of adapter (10) to fall within the ears. Holes (48) are dimensioned to properly receive dimples (21), the tension of ears (46) against the side walls and the dimples, protruding through the holes, thereby holding in locked relation, adapter (10) to base (42) and thus to the floor of the hard case. Therefore, it is seen how adapter (10), with all of its components on top and within, is easily removed, if you spread ears (46), from a hard case for desk top use. Thus, it can be further seen that the unique release bracket (40) holds down adapter (10) with the unique locking mechanism to insure that adapter (10) is secure in the case, yet permits easy removal.

The floor, side walls, base rails, divider partition and the release bracket are preferably constructed of 0.050 inch aluminum, which may be anodized. This provides for a durable yet lightweight adapter. The cushions on the bottom of the floor may be made of rubber. The attachment means of preferably industrial strength ("Dual Lock ®"—a registered trademark of the 3M Company), and are used to attach the computer and printer components to the base rails.

In an alternative embodiment, the base rails are supplanted by a full, covered top. However, this is heavier and creates more drag when the paper is pulled out. Another alternative embodiment would omit attachment means (19) and simply have the computer and printer permanently fastened to the adapter.

USE OF THE ADAPTER

The computer, with attachment means located on a flat bottom side thereof, is placed above the electrical compartment on the top surface of the two base rails. The printer is placed likewise over the paper compartments so the edge of its flat bottom abuts or sits within the lip guide. The paper is inserted through the open end of the paper compartment and sits flush on the floor thereof. The paper feeds out the open end and into the printer. Thus, as the paper feeds into the printer, it gets dragged across the underside of the side rails. The open top of the adapter, afforded by side rails that extend inward only partially, thus insures a minimum of drag on the paper. This overcomes shortcomings of the prior art, with a fully enclosed paper compartment imparting too much drag on the paper, and therefore jamming the feeder.

Operating the computer and printer off conventional 110 volt alternating current requires electrical adapters for the computer and printer. These electrical adapters are stored in the electrical compartment. Electrical cards and conductors going to and from these components may be routed through optional window(s) or the open end of the electrical compartment. The clips allow holding the cards to the adapter.

Thus assembled, the adapter with components secured therein is fixedly or removably attached to the bottom shell of a hinged, protective case such as those manufactured by SKB, Samsonite, and Halliburton. The case may be hard or soft, but is preferably hard. In use, one only need open the case and either remove the adapter or unhinge (hard case) or unzip (soft case) the top shell of the case for use as a portable work station. Moreover, removal of the adapter allows the work station to maintain its portability without the case. Therefore, the adapter lets the work station to be transported and set up in the work place or in an automobile, as by placement in the pedestal mount disclosed above.

Terms such as "left", "right", "up", "down", "top", "buttom", "front", "back", "in", "out" and the like are applicable to the embodiment shown and described in conjunction with the drawings. These terms are merely for the purposes of description and do not necessarily apply to the position or the manner in which the invention may be constructed or used.

Although the invention apparatus has been described in connection with the preferred embodiment, it is not intended to limit the invention to a particular form set forth, but on the contrary, it is intended to cover such alternatives, modifications and equivalents as may be included within the spirit and scope of the invention as defined by dependent claims.

I claim:

1. A system for releasibly retaining a computer, a printer, at least one electrical adapter and paper to a bottom wall of a bottom shell of a protective carrying case, the case comprising the bottom shell, a similarly dimensioned top shell and a joinder means attaching the shells along adjacent portions thereof, the system comprising:
   a rectangular frame, including a flat, planar floor with an interior and exterior surface, two side walls projecting substantially vertically from the floor, and two support rails projecting vertically inward from the side walls, the support rails having a first end and a second end and a top surface and a bottom surface, the frame thereby having an interior portion with a substantially closed floor, and being substantially open at a first end and a second end thereof;
   a partition means extending perpendicular to the planar floor of said frame dividing the interior of said frame into a first compartment and a second compartment, the compartments being laterally adjacent, the first compartment dimensioned to and capable of holding paper for the printer, the second compartment for holding at least one electrical adapter;
   attachment means for attaching the computer and the printer on the top surface of the support rails; and
   retainment means for releasibly retaining the frame to the bottom shell of the protective case.

2. The device as described in claim 1 wherein the walls of said frame include window means, the window means to provide access to the second compartment of the adapter of the frame.

3. The device as described in claim 1 further comprising cushion means, the cushion means for mounting on the exterior surface of the floor of said frame, for cushioning said frame against a platform on which it rests.

4. The device as described in claim 1 further comprising a straight, rigid brace means, said brace means extending transverse to the support rails at the first end thereof, for bracing the support rails, the brace means further containing a lip for aligning an edge of the printer thereto.

5. The device as described in claim 1 further comprising a wall, the wall integral with the floor of said frame and projecting generally normal thereto, part way into the first open end of the first compartment, the wall for retaining paper within the first compartment.

6. The device as described in claim 1 wherein said attachment means is capable of releasably retaining the computer and the printer to the adapter and comprises "Dual Lock ®" fasteners.

7. The device as described in claim 1 wherein said floor, said side walls and said base rails form a generally rectangular structure with the following dimensions: length between 15 and 20 inches; width between 9 and 10 inches; and height between 1.5 and 3 inches.

8. The device as described in claim 1 wherein said retainment means comprises a housing, fixedly secured to the bottom shell of the protective carrying case, said housing dimensioned to receive said rectangular frame therein, said housing having engagement means for releasably engaging said housing to said rectangular frame.

9. The device as described in claim 1 wherein the support rails extend fully across the top of said frame to join and form a substantially closed top.

10. The device as described in claim 8 wherein said attachment means comprising "Dual Lock ®" fasteners.

11. The device as described in claim 8 wherein said floor, said side walls and said base rails form a generally rectangular structure with the following dimensions: length between 15 and 20 inches; width between 9 and 10 inches; and height between 1.5 and 3 inches.

12. The device as described in claim 1 wherein the support rails of said rectangular frame project only part way inward or towards the other and form a substantially open top.

13. A system for releasibly retaining a computer, a printer, at least one electrical adapter and paper to a bottom wall of a bottom shell of a protective carrying case, the case comprising the bottom shell, a similarly dimensioned top shell and a joinder means attaching the shells along adjacent portions thereof, the system comprising:
   a rectangular frame, including a flat floor with an interior and exterior surface, two side walls projecting substantially vertically from the floor, and two support rails projecting vertically inward from the side walls, the support rails having a first end and a second end and a top surface and a bottom surface, the frame thereby having an interior portion with a substantially open top and a substantially closed bottom, and being substantially open at a first end and a second end thereof, said frame also including window means to provide access through the side walls to the interior portion and a straight, rigid brace means, said brace means transverse to the support rails at the first end thereof, for bracing the support rails, the brace means further containing a curved lip for aligning an edge of the printer;

a partition means dividing the interior of said frame into a first compartment and a second compartment, the first compartment dimensioned to and capable of holding paper for the printer, the second compartment for holding at least one electrical adapter;

attachment means for releasably attaching the computer and the printer on the top surface of the support rail, said attachment means comprising velcro type fasteners;

retainment means for releasably retaining the frame to the bottom shell of the protective case; and cushion means for mounting on the exterior surface of the floor of said rectangular frame, for cushioning said frame against a platform on which it rests.

14. The device as described in claim 13 further comprising a wall, the wall integral with the floor of said frame and projecting generally normal thereto, part way into the first open end of the first compartment and part way across the first open end, the wall for retaining paper within the first compartment.

* * * * *